United States Patent
Lazur

(10) Patent No.: US 9,598,321 B2
(45) Date of Patent: Mar. 21, 2017

(54) MELT INFILTRATION WICK ATTACHMENT

(71) Applicant: Rolls-Royce Corporation, Indianapolis, IN (US)

(72) Inventor: Andrew J. Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 478 days.

(21) Appl. No.: 14/207,167

(22) Filed: Mar. 12, 2014

(65) Prior Publication Data

US 2016/0159699 A1 Jun. 9, 2016

Related U.S. Application Data

(60) Provisional application No. 61/801,934, filed on Mar. 15, 2013.

(51) Int. Cl.

| | | |
|---|---|---|
| *C04B 41/45* | (2006.01) | |
| *C04B 41/00* | (2006.01) | |
| *B22F 3/26* | (2006.01) | |
| *C04B 35/573* | (2006.01) | |
| *C04B 35/628* | (2006.01) | |
| *C04B 35/80* | (2006.01) | |

(Continued)

(52) U.S. Cl.
CPC ............ *C04B 41/4584* (2013.01); *B22F 3/26* (2013.01); *C04B 35/573* (2013.01); *C04B 35/62863* (2013.01); *C04B 35/62868* (2013.01); *C04B 35/62873* (2013.01); *C04B 35/806* (2013.01); *C04B 41/009* (2013.01); *C04B 41/0018* (2013.01); *C04B 41/507* (2013.01); *C04B 41/5096* (2013.01); *C04B 41/5133* (2013.01); *C04B 41/85* (2013.01); *C04B 41/88* (2013.01); *C22C 1/1036* (2013.01); *C04B 2235/5244* (2013.01); *C04B 2235/5248* (2013.01); *C04B 2235/616* (2013.01); *F05D 2300/6033* (2013.01)

(58) Field of Classification Search
CPC ....... B22F 3/26; C04B 35/565; C04B 35/573; C04B 35/62863; C04B 35/62868; C04B 35/62873; C04B 35/806; C04B 41/009; C04B 41/4523; C04B 41/4584; C04B 41/5001; C04B 41/507; C04B 41/5094; C04B 41/5096; C04B 41/5133; C04B 41/5155; C04B 41/85; C04B 41/88; C22C 1/1036

See application file for complete search history.

(56) References Cited

U.S. PATENT DOCUMENTS

| | | |
|---|---|---|
| 1,184,523 A | 5/1916 | Field |
| 3,310,427 A | 3/1967 | Cheney et al. |

(Continued)

FOREIGN PATENT DOCUMENTS

BE 643053 A 7/1964

OTHER PUBLICATIONS

International Search Report and Written Opinion for International Application No. PCT/US2014/024595, Jul. 17, 2014, 9 pages.

(Continued)

*Primary Examiner* — Jonathan Langman
(74) *Attorney, Agent, or Firm* — Brinks Gilson & Lione

(57) ABSTRACT

A method and apparatus for providing molten metal infiltration into a component is provided.

20 Claims, 6 Drawing Sheets

(51) Int. Cl.
 *C22C 1/10* (2006.01)
 *C04B 41/85* (2006.01)
 *C04B 41/88* (2006.01)
 *C04B 41/50* (2006.01)
 *C04B 41/51* (2006.01)

(56) References Cited

U.S. PATENT DOCUMENTS

| | | |
|---|---|---|
| 4,036,280 A | 7/1977 | Rohrig et al. |
| 4,141,948 A | 2/1979 | Laskow et al. |
| 4,148,894 A | 4/1979 | Hillig et al. |
| 4,149,704 A | 4/1979 | de Savigny |
| 4,220,455 A | 9/1980 | St. Pierre et al. |
| 4,238,433 A | 12/1980 | Hillig et al. |
| 4,240,835 A | 12/1980 | Laskow et al. |
| 4,242,106 A | 12/1980 | Morelock |
| 4,247,304 A | 1/1981 | Morelock |
| 4,353,953 A | 10/1982 | Morelock |
| 4,522,322 A | 6/1985 | Guntermann et al. |
| 4,626,516 A | 12/1986 | Morelock |
| 4,793,859 A | 12/1988 | Morelock |
| 5,164,098 A | 11/1992 | Brown et al. |
| 5,198,167 A | 3/1993 | Ohta |
| 5,205,970 A | 4/1993 | Brun et al. |
| 5,390,723 A | 2/1995 | Mohla et al. |
| 5,464,655 A | 11/1995 | Takahata |
| 5,718,415 A | 2/1998 | Dainton |
| 6,110,535 A | 8/2000 | Rey et al. |
| 6,120,726 A | 9/2000 | Eggert et al. |
| 6,148,899 A | 11/2000 | Cornie et al. |
| 6,186,768 B1 | 2/2001 | Schmitt |
| 6,223,937 B1 | 5/2001 | Schmidt |
| 6,235,379 B1 | 5/2001 | Kameda et al. |
| 7,238,308 B2 | 7/2007 | Rosenloecher |
| 7,736,554 B2 | 6/2010 | Thebault et al. |
| 8,071,011 B2 | 12/2011 | Drozny et al. |
| 8,083,987 B2 | 12/2011 | Schlienger |
| 2004/0113302 A1 | 6/2004 | La Forest |
| 2006/0006212 A1* | 1/2006 | Thebault .................. B23K 1/08 228/121 |
| 2006/0169404 A1* | 8/2006 | Thebault ............... C04B 35/573 156/307.3 |
| 2009/0092822 A1* | 4/2009 | Drozny ................. C04B 35/573 428/320.2 |
| 2011/0096121 A1 | 4/2011 | Anderson et al. |
| 2011/0274911 A1 | 11/2011 | Drozny et al. |
| 2014/0306372 A1 | 10/2014 | Gillessen |
| 2015/0343714 A1 | 12/2015 | Weimer |

OTHER PUBLICATIONS

International Search Report for PCT International Application Serial No. PCT/US2014/024965, completed Jul. 17, 2014, (11 pages).

\* cited by examiner

MELT INFILTRATION WICK ATTACHMENT

CROSS REFERENCE TO RELATED APPLICATIONS

This application claims priority to and the benefit of U.S. Provisional Patent Application No. 61/801,934, filed 15 Mar. 2013, the disclosure of which is now expressly incorporated herein by reference.

FIELD OF THE DISCLOSURE

The present disclosure relates generally to ceramic matrix composites, and more specifically to melt infiltration.

BACKGROUND

Ceramic Matrix Composites (CMCs) are materials that include ceramic fibers embedded in a ceramic matrix. CMCs typically exhibit desirable mechanical, chemical and physical properties at high temperatures. For example, CMCs are typically more resistant to oxidation at high temperatures than are metals. CMCs are generally tougher than monolithic ceramics and exhibit damage tolerance. Accordingly, CMCs are suitable for a number of high temperature applications, such as for example and without limitation use in producing components of gas turbine engines. Gas turbine engines illustratively are used to power aircraft, watercraft, power generators, and the like. CMC components illustratively may operate at much higher temperatures than other components, including for example superalloy metal components.

The manufacture of CMCs typically includes introducing a melt infiltrant to the ceramic matrix or composite body. Infiltration may be accomplished through a wick. The wick typically is disposed between the source of the infiltrant and the composite body on a generally flat surface.

SUMMARY

The present application discloses one or more of the features recited in the appended claims and/or the following features which, alone or in any combination, may comprise patentable subject matter.

An illustrative wick attachment comprising: a wick; a component; and a weld material is provided wherein the wick and the component are attached together using the weld material. Suitable weld materials include for example and without limitation Si/Zr, Si, Zr/Si, $ZrB_2$ and $TiB_2$.

The weld materials may be used with suitable infiltrants including for example and without limitation silicon, Si/C/B, Zr/Si, Zr and Ti/6Al/4V. Illustratively, the melting point of the weld material will be higher than the melting point of the infiltrant.

The illustrative wick attachment may comprise a spot weld or a continuous weld using any suitable welding material. Multiple wicks may be attached with one or more components.

According to another aspect of the invention, an illustrative method of infiltrating a material into a component is provided. The illustrative method comprises the steps of providing a wick; providing a component in fluid communication with the wick; and coupling together the wick and the component. The coupling may be accomplished by welding.

Illustratively, any suitable weld materials may be used including for example and without limitation Si/Zr, Si, Zr/Si, $ZrB_2$ and $TiB_2$.

Illustratively, the welding may be accomplished using any suitable welding process including for example and without limitation Gas Tungsten Arc Welding, Tungsten Inert Gas, Gas Metal Arc Welding, Metal Inert Gas, resistance welding, laser welding, e-beam welding, local metal casting or a range of plasma spray and cold metal spray processes An illustrative infiltration apparatus may comprise or be adapted to include a material having a melting point. The material, may be for example an infiltrant. The apparatus may further include a second material, which may serve as a barrier. The barrier illustratively has a melting point that is illustratively higher than the melting point of an infiltrant. The apparatus may further comprise an article of manufacture such as a component. Included in the illustrative embodiment is a wick in communication with the component. The wick is also illustratively in communication with the infiltrant. The wick is also illustratively in communication with the infiltrant. Illustratively the wick is attached or coupled to the component by a weld. The weld may be a spot weld or a continuous weld. The component may comprise a ceramic matrix composite.

In some embodiments, the infiltrant may be received by a melt reservoir such as for example a crucible.

In another aspect, a method of infiltrating a material into a component is disclosed. The illustrative method may comprise the step of providing a wick in fluid communication with a porous component. The wick and the component may be coupled together, for example as by welding. The component may comprise a ceramic matrix composite.

In one aspect, the method may include providing an infiltrant source having an infiltrant material therein. Illustratively, the method may include infusing the infiltrant into the component by introducing the infiltrant into and through the wick. The method may include providing a barrier. The barrier illustratively may be disposed between the infiltrant and the component. Illustratively the barrier has a melting point that is higher than the melting point of the infiltrant. Raising the temperature of beyond the melting point of the barrier allows the infiltrant to flow through the wick to the component. The method includes choosing the barrier to control the parameters of the infiltration. For example, the time of infiltration and/or the temperature may be controlled. The component may comprise a ceramic matrix composite.

In another illustrative aspect of the disclosure, disclosed is an infiltration apparatus comprising: an infiltrant source having spaced-apart side walls defining a infiltrant well including a discharge conduit, the infiltrant well adapted to receive therein an infiltrant having a first melting point; a component; and means for controlling fluid communications between the infiltrant source and the component. The means illustratively may comprise one or more wicks in fluid communication with the component. The one or more wicks may be coupled together with the component, as for example by welding. The component may comprise a ceramic matrix composite.

Illustratively, the apparatus and methods provide the ability to control molten metal contact time with the composite body resulting in limited degradation of the composite body. Also, improved uniformity of the microstructure resulting from the reaction of infiltrant and elements in the composite body may be realized.

The method and apparatus illustratively provide for improved component infiltration leading to higher density, higher proportional limit and longer component life.

The method and apparatus illustratively provide the ability to control molten metal contact time with the composite body resulting in limited degradation of the composite body.

The method and apparatus illustratively provide for improved uniformity of the microstructure resulting from the reaction of infiltrant and elements in the composite body.

Illustratively, improved ability to monitor the process if coupled with thermal imaging or other technique because a major change will happen once the barrier is breached and Si begins to flow. This will support accurate process timing to produce more consistent components.

These and other features of the present disclosure will become more apparent from the following description of the illustrative embodiments.

DETAILED DESCRIPTION OF THE DRAWINGS

Figure 1:
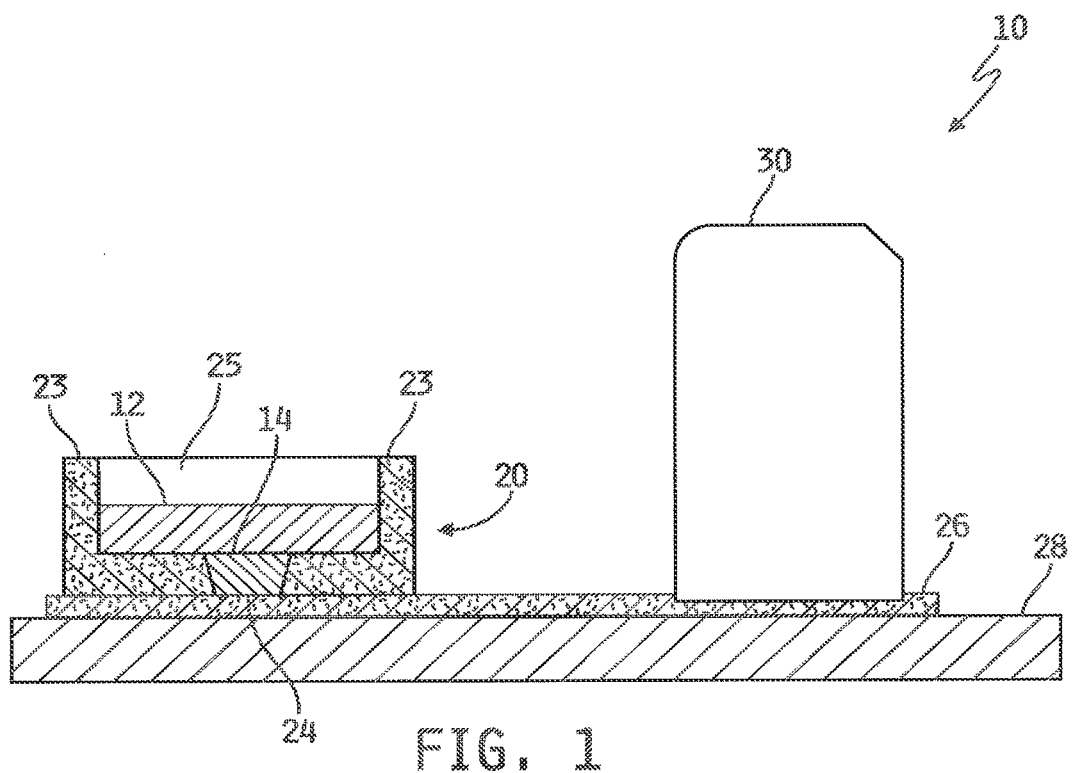
FIG. 1 is a partial cross-sectional view of an illustrative melt transfer system.

For the purposes of promoting an understanding of the principles of the disclosure, reference will now be made to a number of illustrative embodiments illustrated in the drawings and specific language will be used to describe the same.

Referring to the Figures an illustrative apparatus 10 and method for controlling melt transfer related to the manufacture of a ceramic matrix composite (CMC) and/or metal matrix composite is depicted and disclosed. For example, the illustrative apparatus may temporarily restrict the flow of molten metal or molten metalloid to a ceramic (CMC) or metal matrix composite 30.

Illustratively, referring to the Figures, illustrative embodiments are depicted. As shown in FIG. 1, an illustrative apparatus for practicing a method of manufacturing a CMC or metal matrix composite, for example a component is shown. The illustrative apparatus generally comprises an infiltrant source or vessel 20, which illustratively may comprise a crucible 20, a transport conduit 26, which illustratively may comprise a wick 26, and an article of manufacture 30, which illustratively may comprise a component 30 or a composite 30 as depicted diagrammatically in the Figures. Illustratively, the component 30 is a porous body 30. The crucible 20 illustratively includes a pair of spaced apart side walls 23 that define an infiltrant well 25 therebetween. The well 25 is configured to receive therein a first material or infiltrant 12. Defined in the bottom of the crucible 20 is a discharge conduit 24 or drain 24 in fluid communication with the well 25 and the wick 26 and illustratively disposed therebetween. It should be understood that infiltrant 12 may be deposited in the well 25 for melting, may be melted elsewhere and deposited in the well in molten form, or may be melted elsewhere and deposited in the wick directly or locally. For example and without limitation, the crucible 20 could be bypassed, or even dispensed with completely if desired, in the illustrative embodiments of FIG. 2-3 as will be further explained. In such a case, the infiltrant source 20 will be any suitable delivery device other than the crucible.

The apparatus 10 illustratively is supported or carried by a suitable support structure such as for example and without limitation base plate 28 or other suitable support structure. It will be appreciated that a combination of support structures may also be used as depicted for example in FIGS. 5-9. While the illustrative embodiments shown in FIGS. 5-9 each uses an illustrative base plate 28 (e.g., FIGS. 5, 5A, 7, 8 and 9) to support the component(s) 30, 30A, they each illustratively also use the component 30 as the support for the infiltrant 12, for example in the crucible 20. Further illustratively, FIG. 6 shows an illustrative embodiment where a base plate 28 supports the component 30 and an elevated pedestal 32 support structure to support the crucible 20 and the wick 26. As best seen in FIG. 1, illustratively, the higher melting temperature plug or barrier 14 is received within the drain or discharge 24 of the crucible or infiltrant source 20 holding the infiltrating metal or infiltrant 12. Illustratively, barrier 14 could be a high purity metal where infiltrant 12 is an alloy with a lower melting temperature than the barrier. The differential in melting points may be tailored to achieve the desired result. The plug 14 may be machined and fit into the crucible with adhesive. The plug may also be cast into the crucible. If there are thermal stresses between the plug and the crucible they may be used to improve the seal or the angle between the crucible and the plug and may be tailored to minimize or eliminate any stresses. When the plug 14 reaches its melting point it mixes with the infiltrant 12 and allows the infiltrant 12 to flow into the wick 26 and subsequently the composite body. Thus, the melting of the plug 14 opens drain 24 to provide fluid communication between the infiltrant well 25 and the wick 26.

Figure 2:
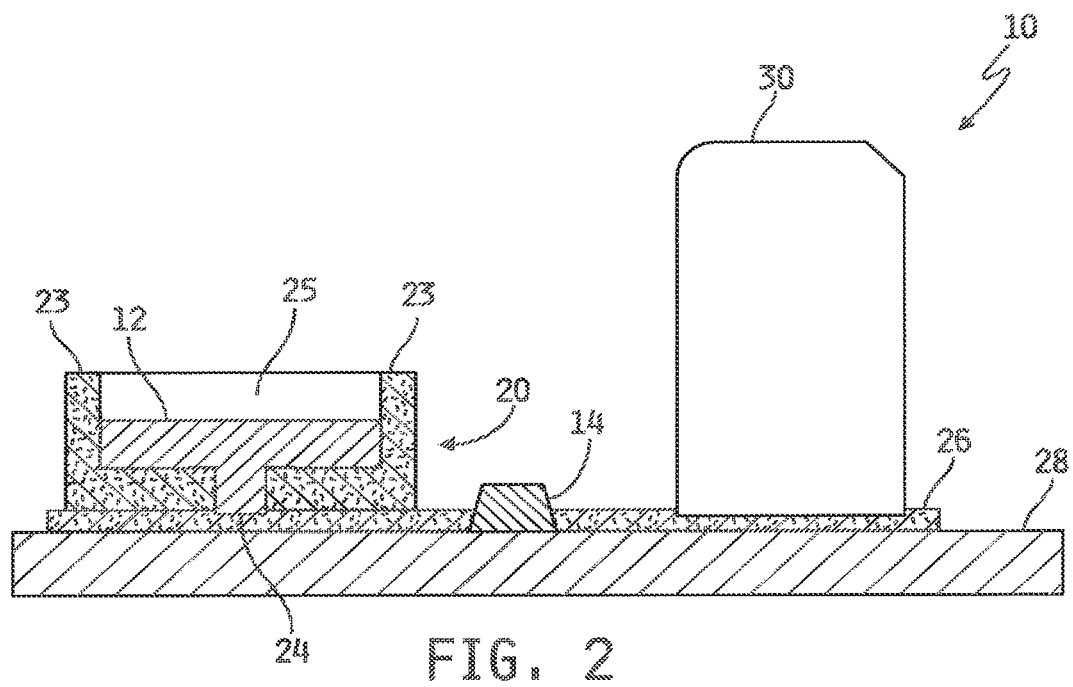
FIG. 2 is a partial cross-sectional view of another illustrative melt transfer system.

As best seen in FIG. 2, an illustrative apparatus for and method of infiltration is shown wherein the wick 26 is filled with the higher melting temperature or temporary dissolving barrier 14 material placed between the infiltrant source or crucible 20 and the component 30. The barrier 14 could be directly under the crucible.

Figure 3:
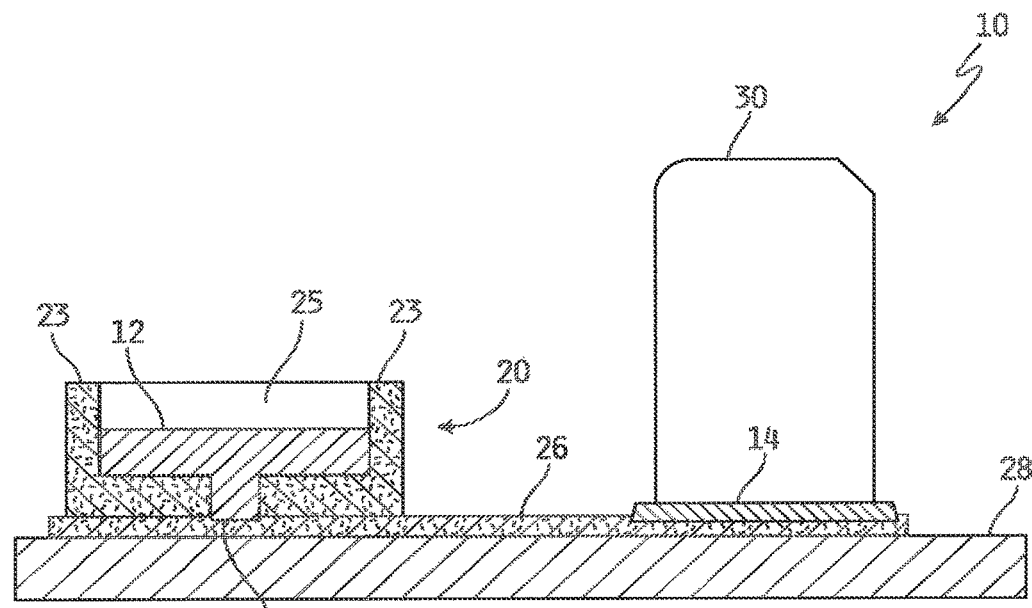
FIG. 3 is a partial cross-sectional view of another illustrative melt transfer system.

FIG. 3 illustrates an exemplary apparatus for and method of infiltration where the higher melting temperature or temporary dissolving barrier 14 material is applied to the composite body or component 30 and makes contact with the wick 26.

Figure 3A:
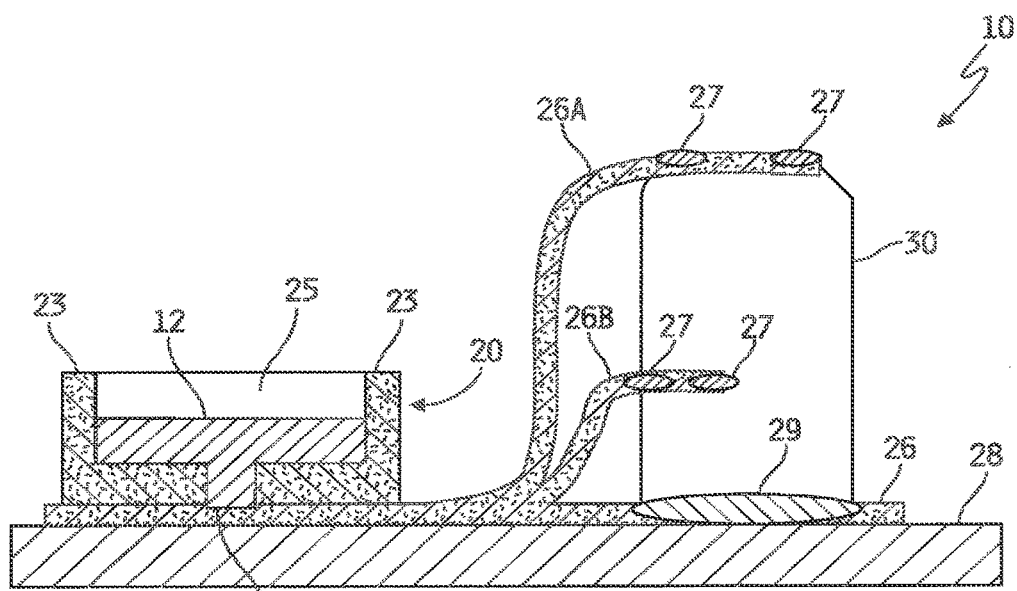
FIG. 3A is a partial cross-sectional view of another illustrative melt transfer system.

FIG. 3A illustrates an exemplary apparatus for and method of infiltration where the higher melting temperature or temporary dissolving barrier 14 material is applied to the composite body or component 30 and makes contact with a wick 26 having multiple branches or prongs 26, 26A, 26B.

Figure 4:
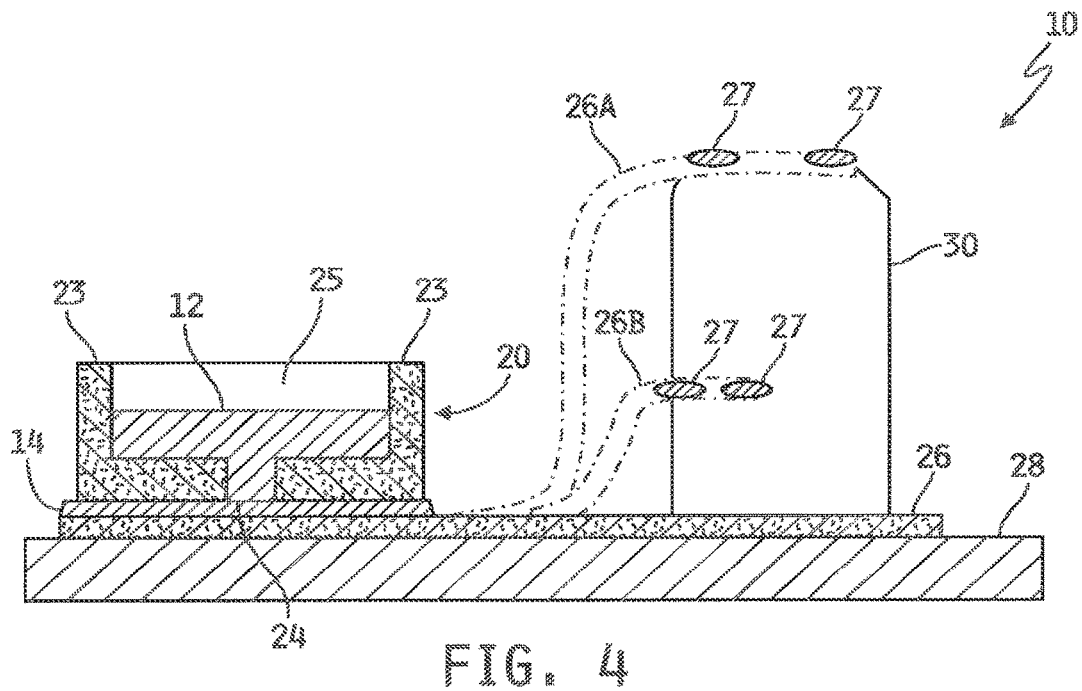
FIG. 4 is a partial cross-sectional view of another illustrative melt transfer system.

FIG. 4 illustrates a method employing a sheet of the higher melting temperature or temporary dissolving barrier material 14 placed under the crucible or infiltrant source 20. In addition, FIG. 4 shows in phantom additional wick prongs or branches 26A, 26B. These additional branches 26A, 26B illustratively operate in the same manner as the main wick 26 in that they allow the infiltrant to flow into the component when the barrier 14 dissolves. It will be appreciated, however, that in an illustrative embodiment wherein the branches 26A, 26B are in a direct line in fluid communications between the component and the infiltrant source, the infiltrant 12 could be directed to the component 30 at different times and temperatures. For example, referring to FIG. 6, a dissolving barrier (not shown) could be disposed over the top of the component 30, which would allow infiltrant moving through branch wicks 26A and 26B to infiltrate prior to the infiltrant moving through the wick 26 at the top that must first melt or dissolve the barrier.

Figure 5:
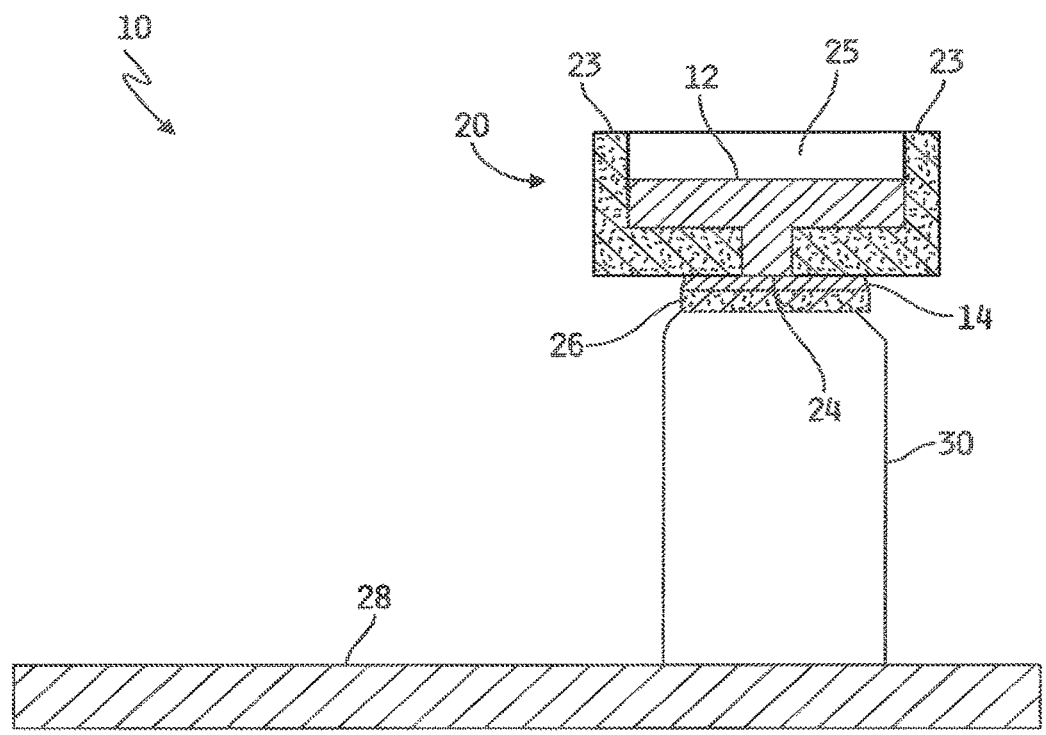
FIG. 5 is a partial cross-sectional view of another illustrative melt transfer system.
Figure 5A:
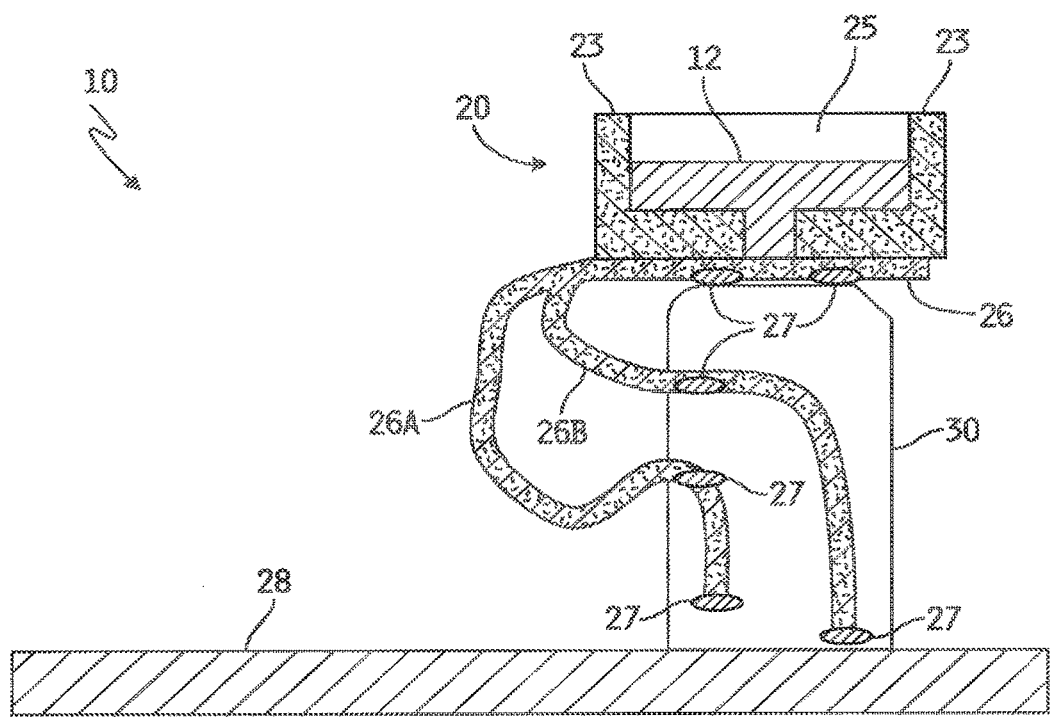
FIG. 5A is a partial cross-sectional view of another illustrative melt transfer system.
Figure 6:
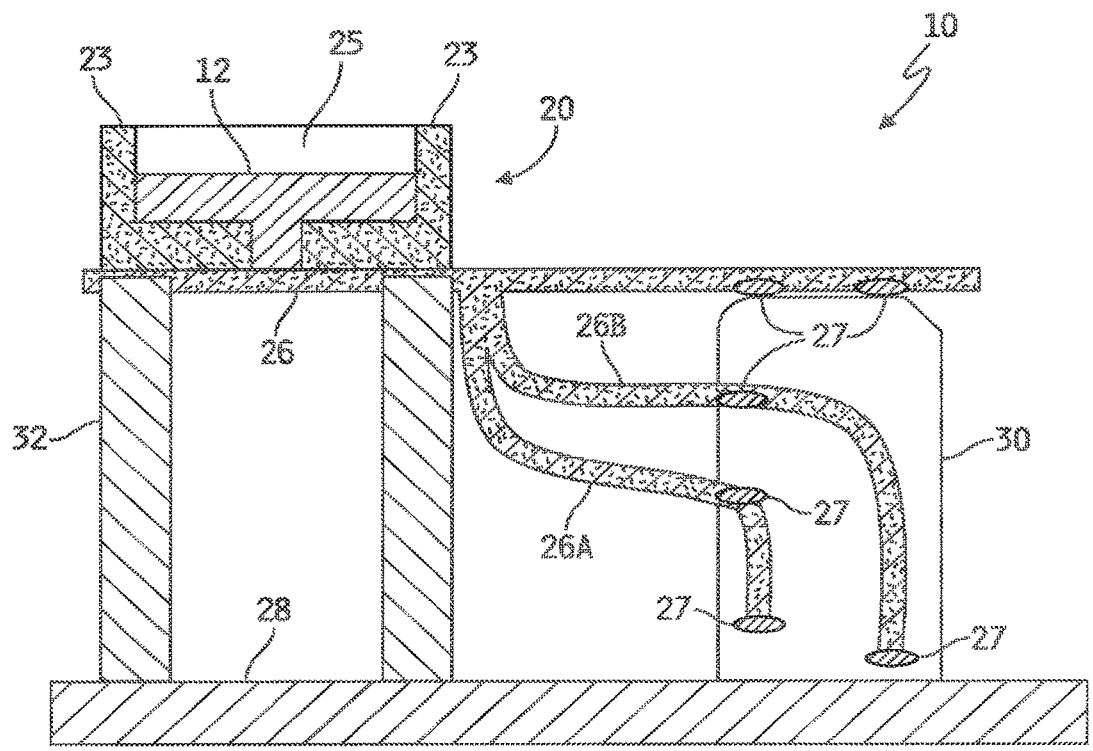
FIG. 6 is a partial cross-sectional view of another illustrative melt transfer system.
Figure 7:
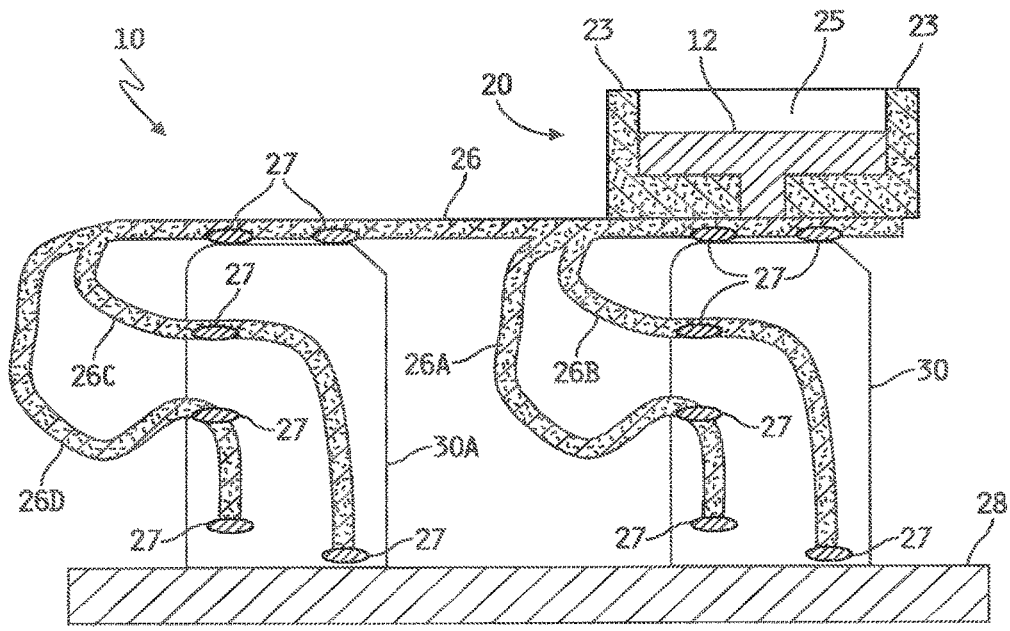
FIG. 7 is a partial cross-sectional view of another illustrative melt transfer system.
Figure 8:
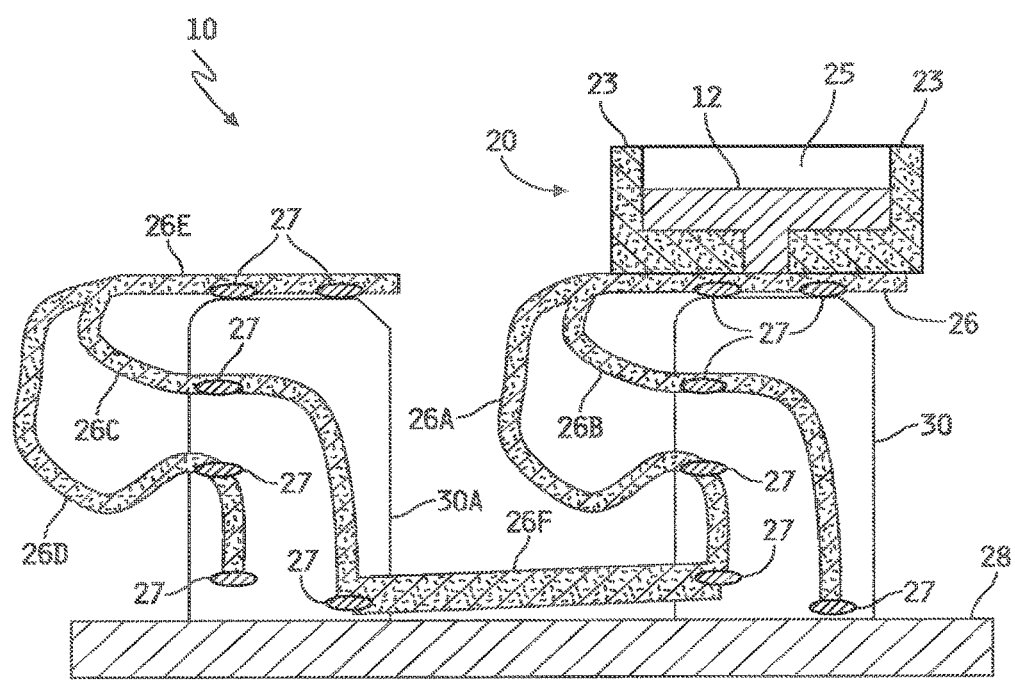
FIG. 8 is a partial cross-sectional view of another illustrative melt transfer system.

Referring to FIG. 5, an exemplary apparatus for and method of infiltration 10 where the infiltrant source 20 is supported directly on the component 30 with the higher melting temperature or temporary dissolving barrier 14 material is applied across and in contact with the entire width of the wick 26, which is disposed across the entire width of the top of the composite body or component 30. It will be appreciated that the wick 26 could be omitted.

The remaining FIGS. 5A through 10 depict illustrative embodiments 10 showing alternative wick arrangements and connections. While the barrier 14 is not shown in these Figs., these illustrative embodiments may all be adapted for use with the apparatus and method 10 disclosed herein. In addition, with respect to the continuous weld 29 of FIG. 3A, it could be a third material with yet a higher melting point relative to the infiltrant 12, such that it could be used in conjunction with or in lieu of a barrier 14.

It will also be appreciated that any combination of the foregoing barrier 14 placements and wicks 26, 26A-F shown in the Figs. could be used to control the infiltration as desired. Also, multiple barriers 14 could be used in a single apparatus 10. In addition, any suitable infiltrant and barrier material and combinations thereof may be used. Some non-exhaustive examples of illustrative infiltrants 12 and higher melting point metal or dissolving barrier 14 are listed below along with some illustrative melting points. This list is illustrative only and not all inclusive.

| Infiltrant | Barrier |
|---|---|
| Pure Si Tmelt 1410° C. | Si/Zr alloy where Tmelt is 1430° C. |
| Si/C/B alloy Tmelt 1395° C. | Pure Si Tmelt 1410° C. |
| Pure Si Tmelt 1410° C. | Pure silicon wafer coated with 1 μm of SiC that dissolves in molten Si |
| Zr/Si eutectic | Zr/Si alloy with Tmelt 40° C. higher |
| Pure Zr | $ZrB_2$ |
| Ti/6Al/4V | Pure Ti |

In illustrative operation, a material such as for example an alloy 14 with a higher melting temperature or a material that requires time in contact with the molten metal to dissolve into solution is employed between the component 30 and the infiltrating metal or metalloid infiltrant 12. This ensures that the component 30 to be infiltrated is uniformly above the melting point of the infiltrant 12. Illustratively, this process and apparatus 10 may be used for reactive melt infiltration processes wherein the reaction may restrict liquid flow so if a portion of the component is below the melting point local freezing of the metal may delay infiltration and during the delay the reaction may create restrictions to the infiltration that would proceed once the required temperature is achieved. Some further illustrative examples follow.

EXAMPLE 1

SiC/SiC CMC

In an illustrative example, a Hi-Nicalon preform is constructed at 36% fiber volume and assembled in tooling for Chemical Vapor Infiltration (CVI). A boron nitride (BN) interface coating is applied at 0.5 μm. A silicon-carbide (SiC) coating of about 2 μm is applied by CVI. The CMC matrix is completed through slurry and melt infiltration 10. The slurry contains elements that react with the silicon to form ceramic compositions. Illustratively, the melt infiltration process is performed using a graphite crucible 20 or other suitable infiltrant source to hold an alloy of for example Si/C/B. As best seen in FIG. 1, an illustrative barrier 14 comprising a plug of pure silicon (Si) is cast or otherwise disposed into a hole, drain or discharge 24 in the bottom of the infiltrant source or crucible 20. The crucible 20 is placed on top of an illustrative carbon fiber wick 26 that illustratively is bonded to the preform or composite body 30. Illustratively, the component 30 may be for example and without limitation a preform for a nozzle guide vane for a turbine engine produced from a silicon carbide fiber. The entire assembly or apparatus 10 is heated in a vacuum furnace to a temperature of about 1470° C. and held for about one (1) hour then cooled to room temperature. The resulting composite has uniform infiltration and microstructure. The melt infiltration process is performed at a pressure of about 0.1 torr and a temperature between about 1400° C. and about 1500° C. using Si that is at least approximately 99% pure.

EXAMPLE 2

C/SiC CMC

In another illustrative example, a T-300 carbon fiber preform is constructed at 36% fiber volume and assembled in tooling for Chemical Vapor Infiltration (CVI). A pyrocarbon interface coating is applied at 0.5 μm. A SiC coating of 8 μm is applied by CVI. The CMC matrix or component 30 is completed through slurry and melt infiltration using the illustrative method and apparatus 10. The slurry contains elements that react with the silicon to form ceramic compositions. The melt infiltration process is performed by applying a Zr/Si alloy to a carbon wick 26. Referring to FIG. 3, the center of the wick 14 has been cast across the entire width of the component 30, which may be for example a component for use in a gas turbine engine, with a rectangle of pure Zr. The entire assembly or apparatus 10 is heated in a vacuum furnace to a temperature of 1570° C. The Zr dissolves into the melt and slightly changes the composition. The furnace is held at temperature for one (1) hour then cooled to room temperature. The resulting composite has uniform infiltration and microstructure. Illustratively, a CMC may be made with pre-coated fiber (aka "prepreg" process).

It will be appreciated that the ability to control the infiltration process as described and claimed herein illustratively results in a CMC component 30 that demonstrates improved mechanical performance. Further illustratively, the apparatus and method 10 may produce a CMC component 30 with a longer operational life, a reduced weight, and at a lower cost.

Turning more particularly to the wick 26, illustratively wicks may be made from materials made from carbon fiber or ceramic fiber woven or non-woven textiles. The wicks 26 may also be porous carbon or ceramic foam or similar materials. In the illustrative method and apparatus 10, the wick 26 illustratively is coupled or connected to the composite component 30 prior to the melt infiltration process. For example and without limitation, the wick 26 and the component 30 may be welded together using any suitable materials and methods of welding. Illustratively, the wick 26 and the component 30 may be welded together for example and without limitation by Gas Tungsten Arc Welding (GTAW, also known as TIG for Tungsten Inert Gas), Gas Metal Arc Welding (GMAW also known as MIG for Metal Inert Gas), resistance welding, laser welding, e-beam welding, local metal casting or a range of plasma spray or cold metal spray processes. If the welding process involves high temperatures it will usually be preferred to conduct the casting or welding process in an inert environment to prevent unintended oxidation of the wick 26 and/or the composite component 30.

Illustratively, the wick 26 may be attached to or coupled with the edge or surface of the part 30. Multiple wicks 26, 26A-F may be attached with this method 10. Illustratively, the textile forming the wick 26 may consist of multiple layers of fibrous or porous materials.

The material used to attach the wick may 26 be the same as the infiltrating metal or infiltrant 12, a similar composition with a higher melting temperature or a totally different material that is compatible with the material system. The weld may be localized 27 as in for example a spot weld, or it may be a continuous weld 29 that runs the entire area of the wick. Illustratively, when the weld material is different from the infiltrant 12 and is not wet or dissolved by the infiltrating metal then the localized method is preferred. The localized method should be done in such a way that contact between the wick 26 and the composite component 30 is well managed. For example and without limitation, this may be accomplished by folding the wick 26 over the welded area and later restraining it in the melt infiltration setup or by other means. When the weld material is not compatible with the final component the wick 26 may for example be attached in an area or areas that will be removed after processing.

Some non-exhaustive examples of illustrative infiltrants 12 and suitable and perhaps higher melting point metal or dissolving weld or casting material are listed below along with some illustrative melting points. This list is illustrative only and not all inclusive:

| Infiltrant | Weld/Casting Material |
| --- | --- |
| Pure Si Tmelt 1410° C. | Si/Zr alloy where Tmelt is 1470° C. |
| Si/C/B alloy Tmelt 1375° C. | Pure Si Tmelt 1410° C. |
| Zr/Si eutectic | Zr/Si alloy with Tmelt 40° C. higher |
| Pure Zr | $ZrB_2$ |
| Ti/6Al/4V | $TiB_2$ |
| Aluminum | Pure Si |

EXAMPLE 3

SiC/SiC CMC

Adding to Example 1 above, an illustrative wick 26 is made of carbon fabric and is welded to two surfaces of the component 30 with pure zirconium in 30% of the contact area. The wicks 26 illustratively are placed into a crucible of pure Si chunks. The entire assembly 10 is heated in a vacuum furnace to a temperature of 1420° C. and held for 1 hour then cooled to room temperature.

EXAMPLE 4

C/SiC CMC

Adding to Example 2 above, an illustrative series of wicks 26, 26A-F are attached to the component 30 in a 0.5 m grid. The melt infiltration process 10 is performed by placing the wicks into a crucible of Zr/Si alloy granules. The entire assembly 10 is heated in a vacuum furnace to a temperature of 1570° C. The furnace is held at temperature for 1 hour then cooled to room temperature.

Figure 9:
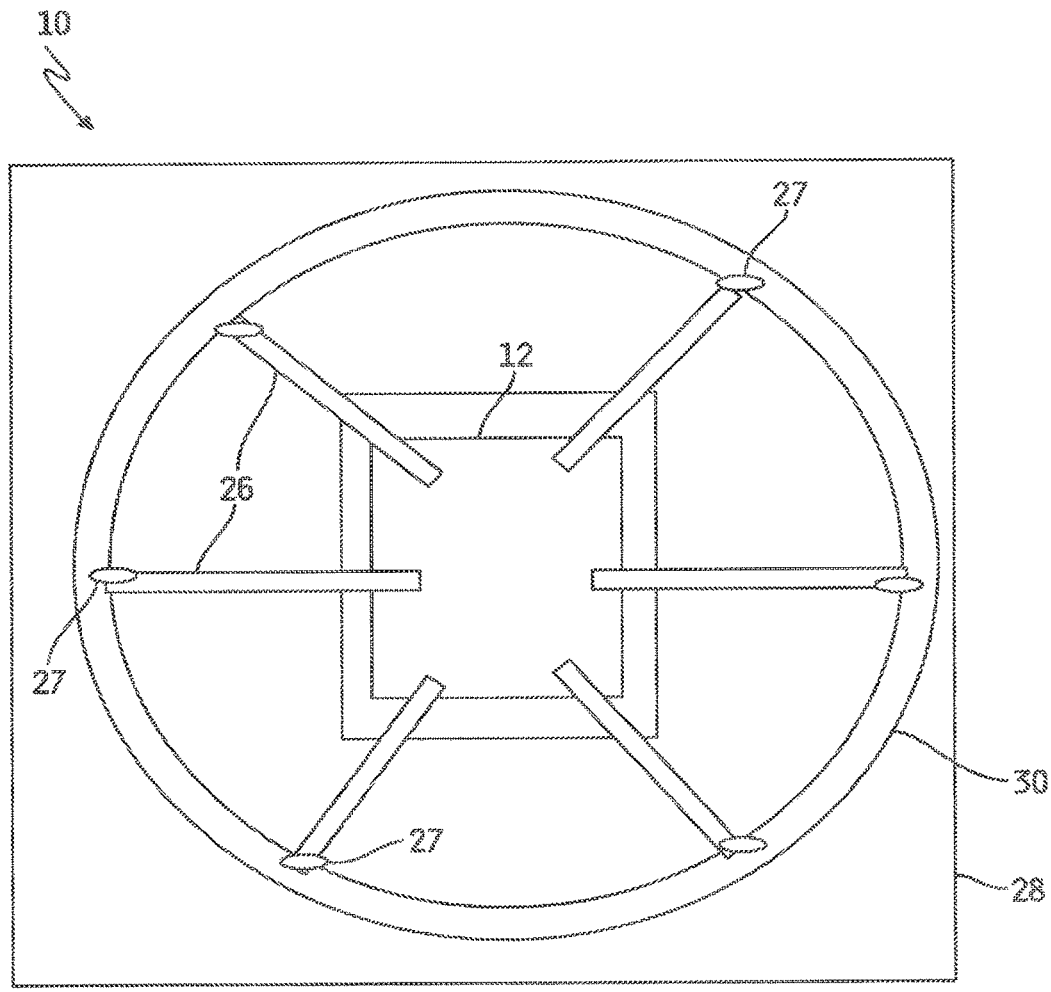
FIG. 9 is a partial cross-sectional view of another illustrative melt transfer system.
Figure 10:
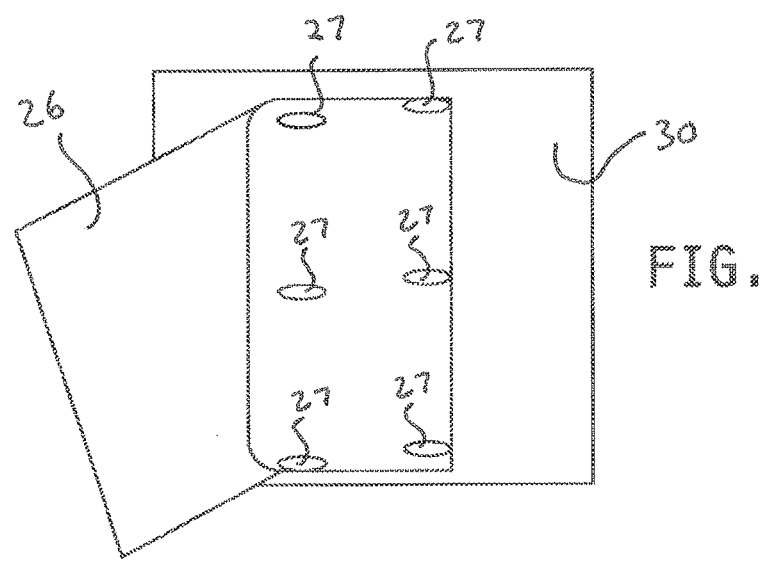
FIG. 10 is a cross-sectional view of the welds of the illustrative melt transfer system of FIG. 9.

As seen in the Figures, it will be appreciated that the above examples may but need not include any of the control features offered by the barrier 14. In addition, any number and configurations of wicks 26 may be used as desired. Illustratively, they may allow infiltration at the top, in the middle, on the sides, at the bottom and any combination of the above. Referring to FIG. 9, an illustrative infiltration network is shown having a radial configuration of wicks 26 extending radially from the infiltrant 12 outwardly to the component 30. The wicks 26 may be made of different materials, be connected in different ways, and be attached to different portions of the apparatus 10 as desired. FIG. 10 illustrates the spot welds 27 of FIG. 9.

Illustratively, the disclosed improved wick contact coupling or connecting 27, 29 may lead to improved component infiltration leading to higher density, higher proportional limit and longer component 30 life. The use of welding provides the ability to place a wick 26 or multiple wicks anywhere on a part or component 30. Multiple wicks 26 illustratively may increase the infiltration rate, decreasing infiltration time thereby reducing heat related degradation of the composite. Illustratively, the use of welded wick(s) provides the ability to infiltrate large parts in reactive melt infiltration processes 10 by supporting the attachment of multiple wicks. Illustratively, the ability to use wicks at chosen locations allows the process to overcome limits on infiltration distance in reactive melt infiltration because another material otherwise may be formed that can hinder or completely block melt infiltration.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A wick attachment comprising:
a wick;
a component; and
a weld material;
wherein the wick and the component are attached together using the weld material that is selected from the group of materials consisting of Si/Zr, Si, Zr/Si, $ZrB_2$ and $TiB_2$, wherein the weld material has a first melting point and the wick is for fluidly communicating an infiltrant having a second melting point to the component, and wherein the first melting point of the weld material is higher than the second melting point of the infiltrant.
2. The wick attachment of claim 1 further comprising an infiltrant source, wherein the wick is in fluid communication with the infiltrant source and the component, the component comprising a ceramic matrix composite.

3. The wick attachment of claim 1 wherein the attachment comprises a spot weld.

4. The wick attachment of claim 1 wherein the attachment comprises a continuous weld.

5. The wick attachment of claim 1 wherein multiple attachments are used.

6. The wick attachment of claim 1 further comprising multiple wicks.

7. The wick attachment of claim 1 further comprising an infiltrant source adapted to receive the infiltrant, wherein the wick is in fluid communication with the infiltrant source and the component and wherein the infiltrant is selected from the group of materials consisting of silicon, Si/C/B, Zr/Si, Zr and Ti/6Al/4V.

8. The wick attachment of claim 1 further comprising an infiltrant source adapted to receive the infiltrant, wherein the wick is in fluid communication with the infiltrant source and the component and wherein the infiltrant is selected from the group of materials consisting of silicon, and Si/C/B.

9. The wick attachment of claim 1 further comprising an infiltrant source adapted to receive the infiltrant, wherein the wick is in fluid communication with the infiltrant source and the component and wherein the infiltrant comprises silicon.

10. A method of infiltrating a material into a component, the method comprising the steps of
providing a wick;
providing a component;
coupling together the component and the wick in fluid communication with one another, wherein the wick and the component are attached together using a weld material that is selected from the group of materials consisting of Si/Zr, Si, Zr/Si, $ZrB_2$ and $TiB_2$, wherein the weld material has a first melting point and the wick is for fluidly communicating an infiltrant having a second melting point to the component, and wherein the first melting point of the weld material is higher than the second melting point of the infiltrant.

11. The method of claim 10 further comprising the step of providing an infiltrant source having the infiltrant contained therein, the wick and the infiltrant being in fluid communication with one another, and wherein the coupling step comprises welding together the wick and the component, the component comprising a ceramic matrix composite.

12. The method of claim 11 wherein the welding step comprises accomplishing the process selected from the group consisting of Gas Tungsten Arc Welding, Tungsten Inert Gas, Gas Metal Arc Welding, Metal Inert Gas, resistance welding, laser welding, e-beam welding, local metal casting or a range of plasma spray and cold metal spray processes.

13. A wick attachment comprising:
a wick;
a component; and
a weld material;
wherein the wick and the component are attached together using the weld material that is selected from the group of materials consisting of Si/Zr, Si, and Zr/Si, wherein the weld material has a first melting point and the wick is for fluidly communicating an infiltrant having a second melting point to the component, and wherein the first melting point of the weld material is higher than the second melting point of the infiltrant.

14. The wick attachment of claim 13 further comprising an infiltrant source adapted to receive the infiltrant, wherein the wick is in fluid communication with the infiltrant source and the component and wherein the infiltrant is selected from the group of materials consisting of silicon, and Si/C/B.

15. The wick attachment of claim 13 further comprising an infiltrant source adapted to receive the infiltrant, wherein the wick is in fluid communication with the infiltrant source and the component and wherein the infiltrant comprises silicon.

16. The wick attachment of claim 13 further comprising an infiltrant source, wherein the wick is in fluid communication with the infiltrant source and the component, the component comprising a ceramic matrix composite.

17. The wick attachment of claim 13 wherein the attachment comprises a spot weld.

18. The wick attachment of claim 13 wherein the attachment comprises a continuous weld.

19. The wick attachment of claim 13 wherein multiple attachments are used.

20. The wick attachment of claim 13 further comprising multiple wicks.

* * * * *